March 6, 1928.

H. G. FRENCH ET AL

SWIVEL WHEEL

Filed Sept. 27, 1924

1,661,889

Inventors
Henry G. French
Edward W. McSheen
by
Their Attorney

Patented Mar. 6, 1928.

1,661,889

UNITED STATES PATENT OFFICE.

HENRY G. FRENCH AND EDWARD W. McSHEEN, OF SCHENECTADY, NEW YORK, ASSIGNORS TO GENERAL ELECTRIC COMPANY, A CORPORATION OF NEW YORK.

SWIVEL WHEEL.

Application filed September 27, 1924. Serial No. 740,418.

Our invention relates to swivel wheels, and particularly to those which are adapted for use in connection with heavy electric switch gear for supporting safety enclosed unit truck panels. The object of our invention is to provide an improved swivel wheel for this purpose which in general shall facilitate moving the truck panels as desired, and shall be of simple and sturdy construction and adapted to be manufactured at a minimum cost.

Our invention will be better understood from the following description taken in connection with the accompanying drawing, and its scope will be pointed out in the appended claims.

Figure 1:
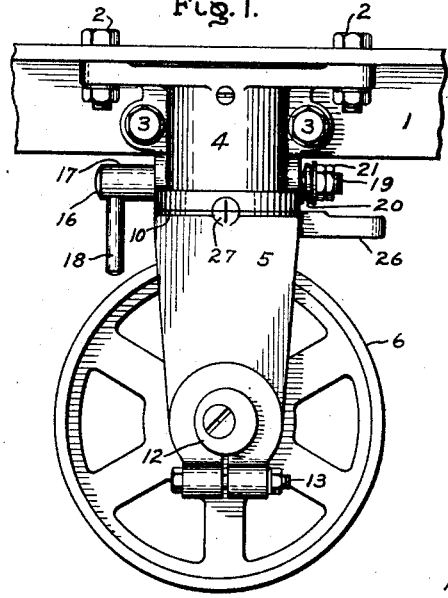
Figure 3:
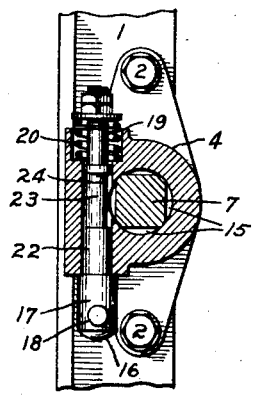
Figure 4:
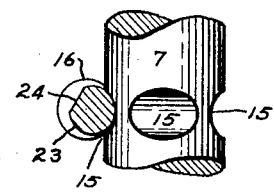
Figure 2:
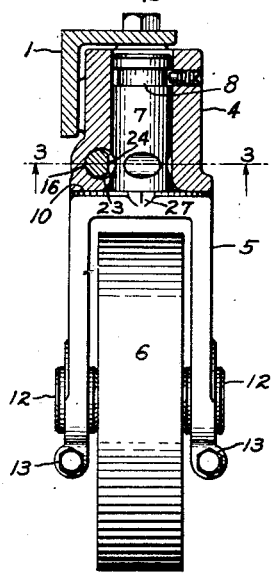

Referring to the drawing, Fig. 1 is a front elevation of the swivel wheel involving our invention together with a portion of the truck panel which it supports; Fig. 2 is a side elevation of the same, parts being shown in section; Fig. 3 is a cross-sectional view taken on the line 3—3 of Fig. 2; and Fig. 4 is a detail drawn to a larger scale.

In the drawing 1 is a portion of the angle iron base of the truck panel to which is secured by means of bolts 2 and 3 the socket member 4. The fork 5, which carries the wheel 6 has a shank 7 which fits in the socket member 4 and for the purpose of preventing accidental disengagement of these parts the upper end of the shank has an annular groove 8 into which projects a screw 9 carried by the socket member. A washer may be used between the shoulder 10 on the fork and the end of the socket member to space them the proper distance and to take the end thrust. The wheel axle is held in the end of the fork 5 by means of eccentric mountings 12 which permit a certain amount of vertical adjustment of the wheel in the fork. The ends of the fork are split and are adapted to be drawn together by bolts 13 to clamp the eccentric mountings.

In a swivel wheel of this sort it is desirable that one be able to lock the swivel by some convenient means in any one of several definite positions. For this purpose I have devised the locking means now to be described. The shank 7 is shown having four similar recesses 15 arranged in the same transverse plane. An enlargement of the socket member 4 has a transverse opening which receives the locking pin 16. This pin has a head 17 at one end carrying a handle 18 and a reduced portion 19 at the other end around which is a small coil spring 20 held compressed by nuts 21 threaded on the end of the pin. The spring 20 serves to resiliently hold the locking pin in position against accidental movement. At the region opposite the shank 7 the main bearing portion 22 of the pin is cut away to form an eccentric 23 one side of which, as shown best in Fig. 4, is faced off at 24. When the pin is turned so that this face is opposite the shank, as shown for example in Fig. 2, the wheel fork may be rotated freely. The axis of the pin 16 is so placed with reference to the upper faces of the recesses 15 that when the pin is rotated counter-clockwise from the position illustrated by Fig. 2 the eccentric portion of the pin will have a cam engagement with the upper portion of one of these recesses 15. This engagement serves simultaneously to produce any slight rotative movement of the fork which may be necessary to bring the wheel into proper angular position and to draw the fork up to the limit of its movement and clamp it. The final clamping position of the pin and shank is shown by Fig. 4 and in this position the fork is rigidly held against any movement. For convenience in rotating the fork it is provided with a lug 26, and to assist in getting the fork and socket member in approximately their proper relative position before turning the clamping pin these members have suitable index marks 27 formed thereon which are brought into alinement or approximately so. While we have shown the shank provided with four recesses, two may be found sufficient arranged at 90 degrees from each other, or at any other desired angle.

What we claim as new and desire to secure by Letters Patent of the United States is:

1. A swivel wheel comprising a socket member, a fork having a shank rotatably mounted therein, a wheel carried by said fork, said shank having a transverse recess in the side thereof, a pin mounted in said socket member having an eccentric portion for engaging in said recess whereby a rotative movement of said pin adjusts said fork angularly and clamps the same to said socket member.

2. A swivel wheel for a truck panel comprising a socket member adapted to be fixed to said panel, a fork having a shank rotatably mounted in said socket member and having a shoulder for engaging the end of said socket member, said shank having a plurality of recesses on the side thereof, a rotatable clamping pin mounted transversely in said socket member and having a reduced eccentric portion adapted when in one position to permit the free rotation of said shank and when rotated to another position to engage in one of said recesses to clamp said fork to said socket member in a predetermined angular position.

3. A swivel wheel comprising a socket member, a wheel supporting member rotatably mounted therein, and means comprising a rotatable pin having an eccentric portion for angularly adjusting said members relative to each other and for clamping the same in adjusted position.

4. A swivel wheel comprising a socket member, a wheel carrying fork having a shank rotatably mounted in said socket member, one of said members having a clamping pin and the other a pin receiving notch, said pin having a side portion adapted when the pin is rotated to angularly adjust the shank relative to the socket member and to clamp the members in adjusted position.

In witness whereof, we have hereunto set our hands this 25th day of September, 1924.

HENRY G. FRENCH.
EDWARD W. McSHEEN.